United States Patent
Braaten et al.

[19]

[11] Patent Number: 5,967,693
[45] Date of Patent: Oct. 19, 1999

[54] ADAPTERS FOR AUGER DRIVE SHAFT

[75] Inventors: Rae Dell Braaten, Fargo; Edward A. J. Larson, Milnor; Verne C. Watts, Lisbon, all of N. Dak.

[73] Assignee: Clark Equipment Company, Woodcliff Lake, N.J.

[21] Appl. No.: 08/871,448

[22] Filed: Jun. 9, 1997

[51] Int. Cl.⁶ .................................................. B65G 33/32
[52] U.S. Cl. .......................... 403/383; 403/361; 403/292; 403/306; 172/25
[58] Field of Search ................................... 403/3, 4, 383, 403/378, 379.3, 379.5, 361, 359, 292, 305, 306, 359.1, 359.5, 359.6; 172/25; 285/112; 81/177.1, 177.2, 177.85; 408/226; 279/143, 144; 464/179, 182, 185

[56] References Cited

U.S. PATENT DOCUMENTS

| | | | |
|---|---|---|---|
| D. 271,206 | 11/1983 | Devey | D15/138 |
| 1,018,172 | 2/1912 | Downs | 403/383 X |
| 1,387,043 | 8/1921 | De Voe . | |
| 2,466,097 | 4/1949 | Graue | 287/1 |
| 2,805,073 | 9/1957 | Fletcher | 279/9 |
| 2,829,503 | 4/1958 | Hayes | 61/77 |
| 3,104,757 | 9/1963 | Dougherty et al. | 403/292 X |
| 3,178,210 | 4/1965 | Dickinson | 403/292 |
| 3,343,612 | 9/1967 | Flowers | 173/163 |
| 4,250,718 | 2/1981 | Brantley | 277/500 X |
| 4,280,768 | 7/1981 | Pardue, Jr. et al. | 403/3 |
| 4,368,789 | 1/1983 | Orr et al. | 403/378 X |
| 4,417,628 | 11/1983 | Gessner | 173/29 |
| 4,617,844 | 10/1986 | Batten | 403/383 |
| 4,691,818 | 9/1987 | Weber | 403/292 X |
| 4,981,156 | 1/1991 | Nicklas et al. | 403/4 X |
| 4,998,590 | 3/1991 | Wells | 175/162 |
| 5,366,312 | 11/1994 | Raines | 403/3 |
| 5,556,217 | 9/1996 | Deyo et al. | 403/61 |

*Primary Examiner*—Harry C. Kim
*Assistant Examiner*—John R. Cottingham
*Attorney, Agent, or Firm*—Westman, Champlin & Kelly, P.A.

[57] ABSTRACT

A drive shaft permits driving two different driven shafts, such as those used on powered earth augers, from a single power source, whether the driven shaft has a circular cross section drive coupling, or a hexagonal cross section drive coupling. In one form an adapter can be slipped over a hexagonal shaft to receive a circular cross section drive coupling, and in another form, a shaft is provided with two axially displaced portions. An outer end portion has a hexagonal cross section, and a slightly larger circular cross section shaft portion is positioned adjacent the power unit.

13 Claims, 3 Drawing Sheets

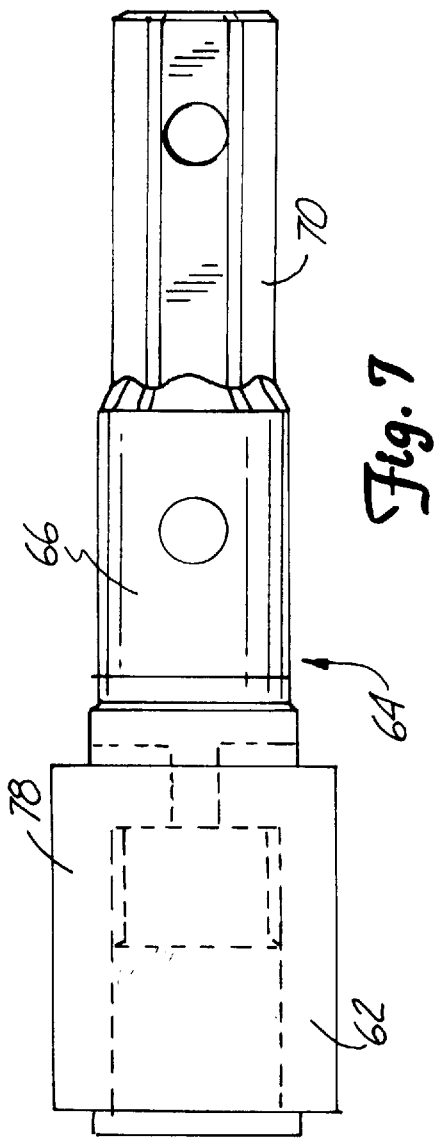
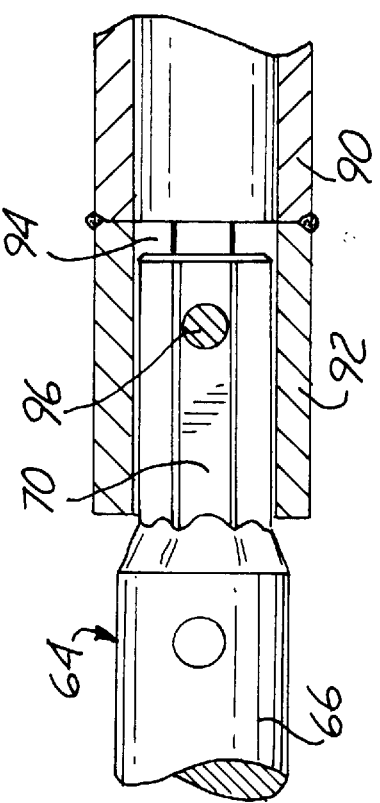
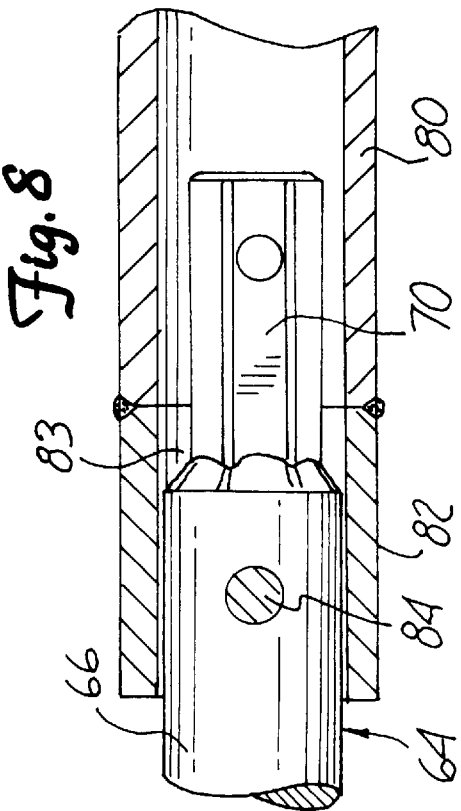

5,967,693

ADAPTERS FOR AUGER DRIVE SHAFT

BACKGROUND OF THE INVENTION

The present invention relates to devices for adapting an auger drive so that it will accommodate both a round cross section drive socket or a hexagonal shaped cross section drive socket of an earth auger that is to be drivably coupled to a power unit.

Powered augers that are mounted onto a skid steer loader, backhoe arm, an excavator arm, or any other desired carrier, are presently made and have both round bore couplings and hexagonal (hex) socket couplings. The augers are driven by a powered output shaft, which could be powered by a hydraulic motor. The output shaft having a corresponding cross section. The circular coupling or socket drives the auger through a cross pin that passes through a cross bore in the drive shaft. The hex socket coupling is effected by the cross sectional shape of the hex socket mating with a hex shaped drive shaft.

In order to have a full selection of auger sizes and power units, customers may want a hex drive or a round shaft with a cross pin drive from the same power source. The drive units generally come in several sizes (at least two). That means that to have direct coupling for augers, there are a minimum of four power units, two with different sized cylindrical shaft drives and two with different size hex shaft drives, to fit the sockets or couplers on augers that are available.

The present invention reduces the number of drives necessary for driving to both hex and round drive shafts.

While various adapters have been advanced for adapting a shaft to drive different size couplings, the present invention relates to adapters that provide an output shaft that drives either a cylindrical socket or coupler or a hex cross section socket or coupler.

SUMMARY OF THE INVENTION

The present invention relates to an adapter that will permit adapting a drive shaft to drive a hex socket of a rotating work tool, such an auger, or to drive a cylindrical socket of a rotating work tool. In a first preferred form of the invention, a sleeve is used in connection with a hexagon cross section drive shaft that slips over the drive shaft and has an outer diameter which is adapted to mate with standard cylindrical sockets of an earth auger when the adapter is in place, and when the adapter is removed the hex drive shaft is for driving an auger having a hex drive socket.

The first adapter, comprising a sleeve, is usable with existing power units that have a hexagonal cross section (hex) output shaft. The hexagonal cross section shaft corners are rounded as necessary so that a sleeve of adequate wall thickness will slide closely over the hex shaped shaft and can be pinned in place thereon with the same pin that drives the auger. The outer diameter of the sleeve is the correct diameter for the cylindrical sockets or couplers of standard earth augers.

A second preferred embodiment of the invention comprises a two stage output drive shaft directly mounted in the power unit, and having both a hexagonal drive portion along one length of the shaft, and a cylindrical drive portion along a second length of the shaft.

The drive portions of the shaft are selected to mate with standard drive sockets on earth augers. The earth auger socket sizes are such that the hex socket has a smaller maximum diametrical dimension (corner to corner on the hex) than the diameter of the cylindrical socket for the same size earth auger. The two stage power unit drive shaft has a hex cross section portion at its outer end which has a maximum diametrical dimension that is less than the diameter of the cylindrical drive portion. When a cylindrical drive socket is to be used, it is slipped over the hexagonal shaped portion of the drive shaft onto the cylindrical drive shaft portion. The outer end hexagonal cross section drive portion slides into the socket and the center opening of the auger drive tube of an auger.

For use with a hex drive socket, the hex drive shaft on the outer end of the power unit drive shaft slips into the hexagonal socket and then is held in place in a suitable manner for driving through the mating hexagonal cross sections of the shaft and the socket. The second preferred embodiment of the invention is usable with either cross section drive socket on an earth auger without removing any parts or adding any parts for use. This greatly enhances the usability of the device.

BRIEF DESCRIPTION OF THE DRAWINGS

FIG. 7 is a side view of the shaft of the present invention removed from the power unit;

FIG. 8 is a fragmentary sectional view of a cylindrical drive socket of a powered earth auger mounted on the shaft shown in FIGS. 5 and 7; and FIG. 9 is a hexagonal cross section drive socket of a powered earth auger mounted on the shaft shown in FIGS. 5 and 7.

DETAILED DESCRIPTION OF THE PREFERRED EMBODIMENTS

Figure 1:
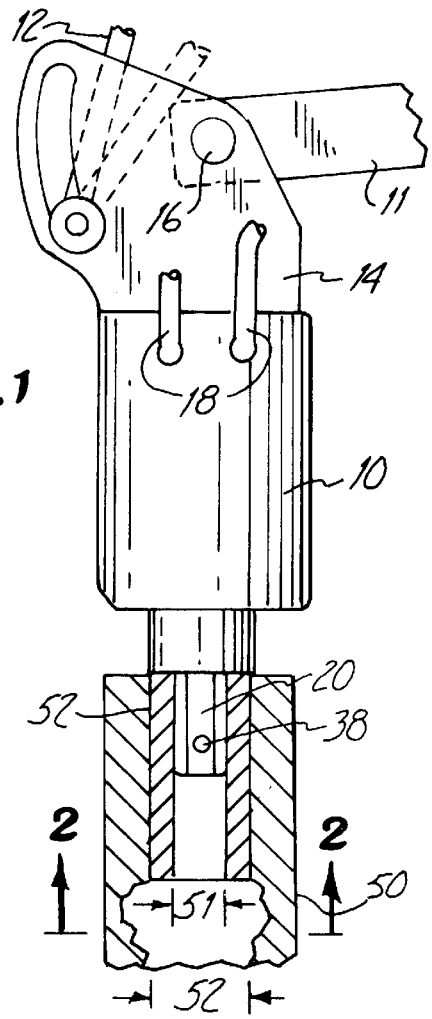
FIG. 1 is a schematic representation of a typical power auger power unit having a conventional hex drive shaft thereon shown with an adapter according to the first form of the invention.

In FIG. 1, a hydraulic motor drive unit indicated generally at 10 is mounted onto a suitable arm 11 of a backhoe of a skid steer loader, an excavator or the like, and has a link 12 for controlling the pivoting of a mounting bracket 14 about a pivot pin 16. The link 12 is controlled from a hydraulic circuit (not shown) and can be of the type shown in U.S. Pat. No. 5,556,217.

The hydraulic motor 10 is connected to a suitable source of fluid under pressure through hoses 18, in a normal manner, and is controlled to rotationally drive an output shaft 20, which in the form shown is a hexagonal cross section shaped output shaft.

For a given power source size, it is standard to provide powered augers with two different types of drive sockets that are connected to the output drive shafts of the same size power unit. Previously, it was necessary to provide two complete power units, one with a cylindrical output shaft for cylindrical socket drives, and the other one with a hexagonal cross sectional output shaft for hexagonal cross section sockets. The present invention permits one shaft to drive both hexagonal and cylindrical socket augers. The augers are made with drive sockets that have standard size bores.

Figure 3:
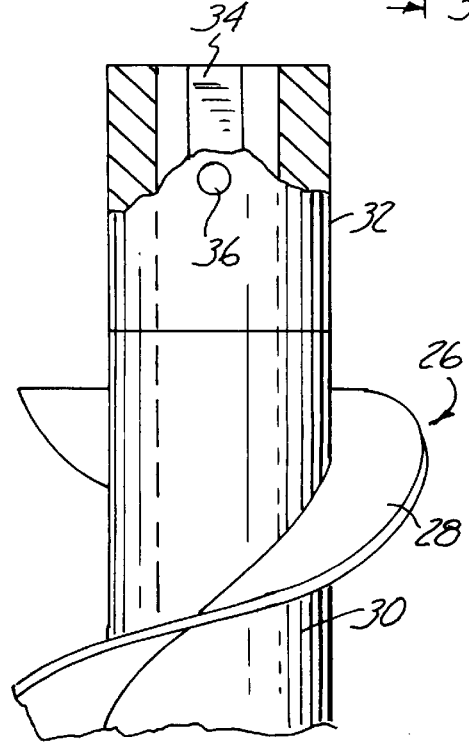
FIG. 3 is a side view of an end of an earth boring auger having a collar or drive socket with a hexagonal cross section.

In FIG. 3, an auger 26 having an auger flight 28 supported on a tube 30 has a drive collar 32. The collar 32 has a hexagonal cross sectional socket or bore 34 and it is of size to mate with a hexagonal cross sectional drive shaft 20 of power unit 10. This is a standard bore or socket and the hexagonal drive socket 34 of the drive collar 32 slips onto the shaft 20 when this auger is to be driven. The auger is pinned to keep it from falling off with a suitable pin through a bore 36 in the collar that mates with a bore 38 on the drive shaft 20.

A second drive auger shown at 40 comprises another earth auger that is used with a motor or power source 10 that is the same size as that shown in FIG. 1. The auger 40 has a drive collar 42 welded onto the end of a tube 44 that mounts the flight 46 which has an interior bore 48 that is cylindrical in cross section. In the standard augers, the cylindrical bores for the same size drive unit are larger than the hex drive sockets. A drive pin is used to, drive the cylindrical socket and the auger shaft.

Figure 2:
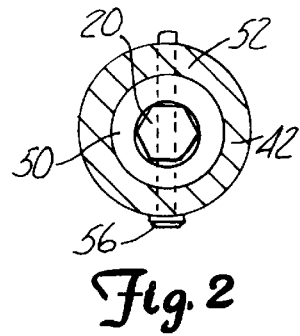
FIG. 2 is an end view of the adapter of FIG. 1 taken on line 2—2 in FIG. 1.

An adapter sleeve shown at 50 is used for adapting the hex drive shaft 20 to make it capable of driving the auger 40 that has the circular cross section cylindrical socket 48. The adapter 50 comprises a sleeve that has an outside diameter indicated at 52 that fits into the socket 48 having an inside diameter indicated at 54. Further, the hexagonal drive shaft 20 can have its corners slightly rounded as shown in FIG. 2 so that the bore 51 of sleeve 50 will fit closely around the drive shaft 20 and yet provide an outside diameter that is suitable for the socket 48. The sleeve has a circular cross section bore 51. The adapter sleeve 50 and drive collar 42 are driven through a pin 56 that is in the bore 38. The socket 48 is shown in position on the sleeve 50 in FIG. 1 for illustrative purposes. The bore of sleeve 50, again, is made to closely fit around the hexagonal cross section shaft 20. Preferably the corners where the sides of the hexagonal cross sectional shaft meet are rounded to accomplish the needed fit.

Thus, the drive shaft 20 drives either a hexagonal socket or a circular cross section socket for versatility.

Figure 4:
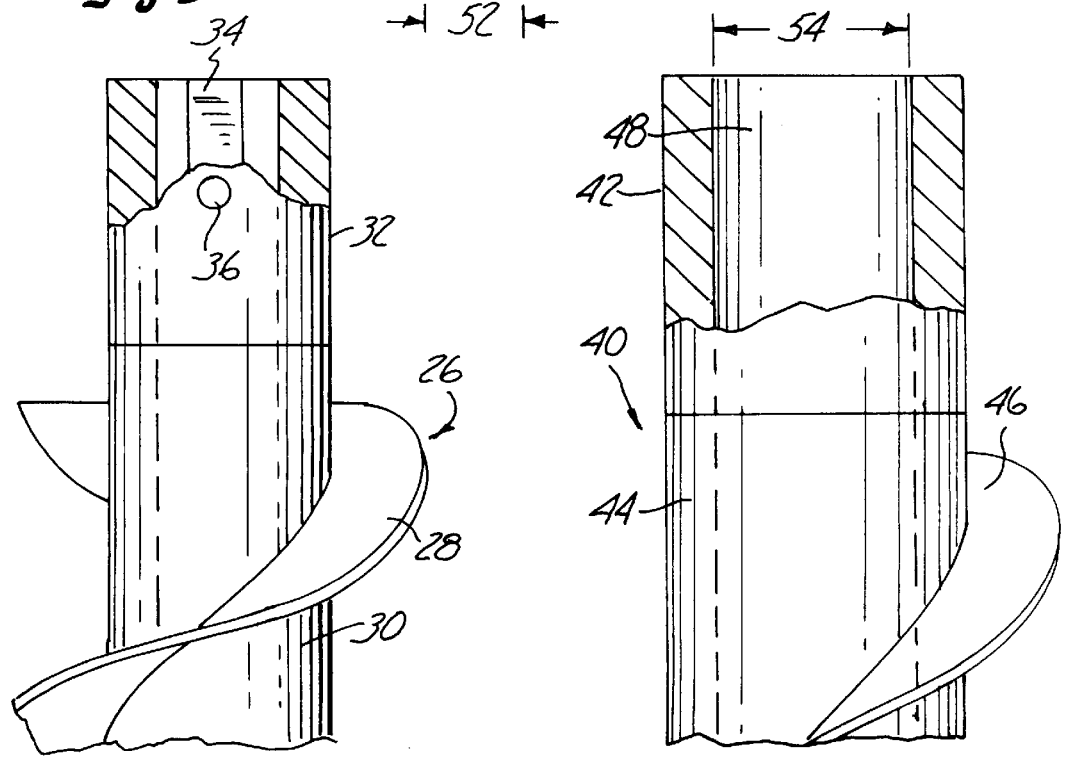
FIG. 4 is a side view of an end portion of an earth boring auger having a cylindrical bore drive socket.

The second embodiment of the invention shown in FIGS. 5–9, is specifically made to provide for a power unit that has a two-stage drive shaft without the need for a separate slip on adapter. It is however adapted for accepting both the cylindrical bore socket augers and the hexagonal cross section bore socket augers shown in FIG. 3 and 4.

Figure 5:
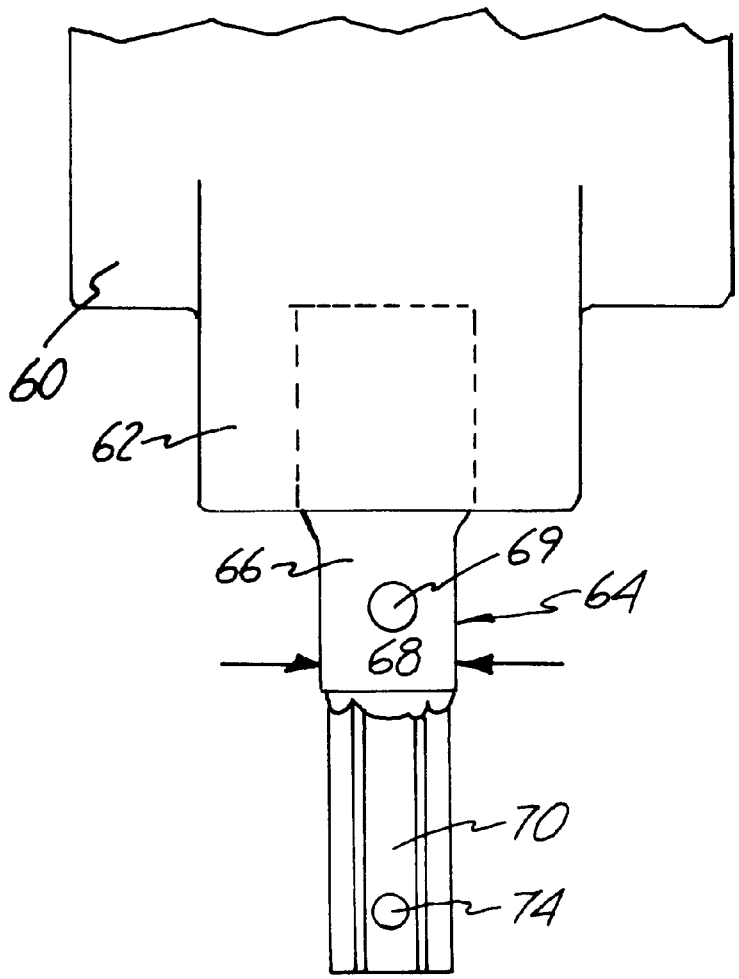
FIG. 5 is a fragmentary end view of a power unit having a shaft adapted for driving two different types of augers and made according to a second embodiment of the present invention.
Figure 6:
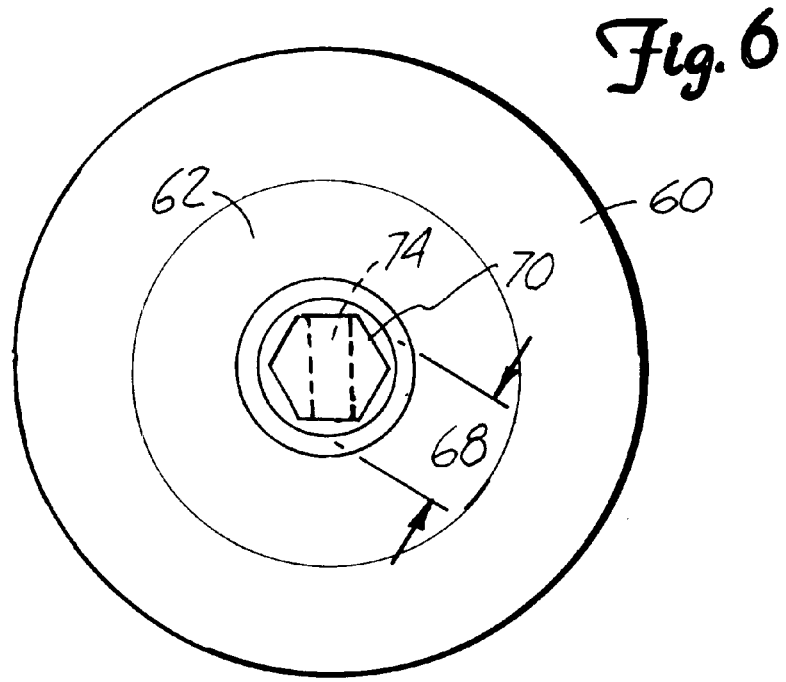
FIG. 6 is a fragmentary end view of the device of FIG. 5.

In FIG. 5, a drive unit shown at 60 can comprise a hydraulic motor are previously explained, and it has a housing or hub 62 that drivably mounts a shaft 64 that is made according to the present invention, and comprises a two stage drive shaft. The two stage drive shaft has a circular cross section cylindrical shaft portion 66 that is adjacent to the hub 62, that is, at the shaft 64 inner end. The cylindrical shaft portion 66 has a diameter indicated at 68 that is of size to fit within an auger standard socket, such as that shown at 48. The shaft section 66 has a cross bore 69 therethrough, for receiving a driving pin that passes through the bore in the socket 48.

The outer end portion of the shaft 64 has a hexagonal cross section drive portion 70 and the hexagonal section has a maximum diametrical dimension, that is diagonally across the corners of the hexagonal shape that is less than the diameter 68. This diagonal dimension of the hexagonal shape is shown at 72 in FIG. 6. The hexagonal cross section in shaft portion 70 also has a cross bore 74 at its end for holding a drive collar of a hexagonal shape in place on the shaft portion.

FIGS. 7, 8 and 9 illustrate the two stage shaft and sockets of the earth boring augers installed thereon. The shaft 64 is shown in FIG. 7, including a coupling end 78 that is driven by the hydraulic motor on the interior of hub 62. FIG. 8 shows the attachments of shaft portion 66 to a power auger having a central auger tube 80 and a drive collar 82 that is welded to the outer end and has an interior socket or bore 83 of size to closely fit the cylindrical section 66 of the shaft 64. This fit is relatively close, as is commonly done, and then a cross pin 84 is provided for driving the collar 82 and the auger tube 80. When the power unit is run, the auger will be rotated.

It should be noted that the hexagonal end section 70 is of smaller maximum diametrical dimension than interior bore 86 of the auger tube 80, so that shaft portion 70 will fit down into the auger tube and will not interfere with the attachment of the auger to cylindrical shaft portion 66 of the drive shaft assembly 64.

FIG. 9 illustrates the use of the hexagonal cross sectional drive shaft portion 70 for driving an auger tube 90 having drive collar 92 with a hexagonal cross section bore or socket 94. The hexagonal cross section bore or socket 94 slips over the hexagonal cross section shaft portion 70. A pin shown at 96 is used for holding the auger tube 90 and collar 92 on the shaft portion 70 to prevent it from falling off. The drive is effected through the mating cross sections of the shaft portion 70 and the bore or socket 94.

Thus, providing a power unit that has the two stage or two portion shaft made according to the present invention eliminates the need for stocking separate power units with two different types of shafts, but yet of the same size or power. The power units are each equipped with a two stage shaft so they can be used for driving either a cylindrical socket earth auger of standard size, or a hexagonal cross section socket earth auger.

Although the present invention has been described with reference to preferred embodiments, workers skilled in the art will recognize that changes may be made in form and detail without departing from the spirit and scope of the invention.

What is claimed is:

1. A power drive unit having an output shaft driven by the power unit including an outer end hexagonal cross section portion, said output shaft having a cylindrical portion with a larger cross section than the hexagonal cross section portion between the hexagonal cross section portion and the power unit and being adapted to drive a cylindrical cross section bore socket of a first rotatable work tool extending in a direction away from the power unit, and selectively and alternatively a hexagonal cross section bore socket of a second rotatable work tool extending in a direction away from the power unit, and the cylindrical portion being adapted to receive the cylindrical bore socket and support the cylindrical bore socket, with the hexagonal cross section portion within the interior of cylindrical bore socket, and a drive and retaining member to effect a drive coupling between the cylindrical portion and said cylindrical bore socket received thereon.

2. The device of claim 1, wherein said cylindrical bore socket is mounted over an adapter sleeve that fits closely onto the hexagonal cross section portion of the shaft.

3. The device of claim 2, wherein said adapter comprises a cylindrical sleeve having an internal bore that fits closely around the hexagonal portion of the shaft, an outer surface of said cylindrical sleeve supporting the cylindrical socket for a shaft to be driven.

4. The device of claim 1, wherein said shaft is adapted to receive the cylindrical bore of a cylindrical socket on a separate section of the shaft axially spaced from the hexagonal cross section portion.

5. A two stage drive shaft connected to an auger drive unit at one end and being connectable selectively to one of a pair of different driven augers having center auger shafts, the drive shaft comprising a first drive shaft portion having a non circular cross section capable of driving a first driven auger having a first center auger shaft through a complementary shaped receptacle in the first center auger shaft, and a second cylindrical drive shaft portion integral with the first drive shaft portion having a larger minimum diametrical dimension than a maximum diametrical dimension of said first drive shaft portion, said second cylindrical drive shaft portion being positioned adjacent the power unit with the first drive shaft portion integral with an outer end of the second cylindrical drive shaft portion and extending outwardly therefrom, the second cylindrical drive shaft portion being adapted to fit within a receptacle on a second different driven center auger shaft to drive the second driven center auger shaft from the second cylindrical drive shaft portion, and wherein the second cylindrical drive shaft portion drives the second driven center auger shaft through a drive and retaining member coupling the second cylindrical drive shaft portion to the second driven center auger shaft.

6. The shaft assembly of claim 5, wherein the second cylindrical drive shaft portion drives the driven shaft through a cross pin coupling the second cylindrical drive shaft portion to the second driven center auger shaft.

7. The shaft assembly of claim 5, wherein said non circular cross section comprises a regular polygonal cross section.

8. The shaft assembly of claim 6, wherein said second cylindrical drive shaft portion includes a cross passageway therethrough for receiving a pin for axially holding the second driven center auger shaft thereon.

9. The shaft assembly of claim 5, wherein said polygonal cross section comprises a hexagon cross section, and the second cylindrical drive shaft portion comprising a circular cross section having a diameter larger than the maximum diametrical dimension of the hexagon cross section of the first shaft portion.

10. In combination, a single drive shaft and a power unit mounting the single drive shaft, the single drive shaft having portions connectable to two different driven shafts having driven shaft receptacles of different size and configuration, comprising a first drive shaft portion at an outer end of the drive shaft and having a non circular cross section capable of driving a first driven shaft having a complementary shaped driven shaft receptacle for receiving the first drive shaft portion, and the drive shaft having a second cylindrical drive shaft portion integrally joining the first drive shaft portion between the power unit and the first driven shaft portion, and the second cylindrical drive shaft portion having a larger minimum diametrical dimension than a maximum diametrical dimension of said first drive shaft portion, said second cylindrical drive shaft portion being adapted to fit within and drive a driven shaft receptacle on a second driven shaft with the first shaft portion in an interior bore portion of the driven shaft receptacle of the second driven shaft in a non driving relation to the second driven shaft, and a removable drive and retainer connection between the driven shaft receptacle of the second cylindrical driven shaft and the second cylindrical drive shaft portion.

11. The combination of claim 10, wherein said removable drive and retainer connection comprises aligning openings through the second cylindrical drive shaft portion and through walls forming the driven shaft receptacle, of the second cylindrical driven shaft and a cross pin in the openings for drivable coupling the second driven shaft portion to the walls forming the driven shaft receptacle of the second driven shaft.

12. The combination of claim 10, wherein said non circular cross section comprises a regular polygon cross section.

13. The combination of claim 12, wherein said polygonal cross section comprises a hexagon cross section, and the second cylindrical drive shaft portion comprising a circular cross section.

* * * * *

UNITED STATES PATENT AND TRADEMARK OFFICE
CERTIFICATE OF CORRECTION

PATENT NO. : 5,967,693
DATED : October 19, 1999
INVENTOR(S) : Braaten et al.

It is certified that error appears in the above-identified patent and that said Letters Patent is hereby corrected as shown below:

Line 11, line 5, delete "cylindrical".

Signed and Sealed this

Twenty-fourth Day of October, 2000

Attest:

Q. TODD DICKINSON

*Attesting Officer*            *Director of Patents and Trademarks*